C. A. HURTIG AND G. R. TAYLOR.
CHANGE SPEED DEVICE.
APPLICATION FILED MAY 2, 1917.
1,304,052.
Patented May 20, 1919.
2 SHEETS—SHEET 2.
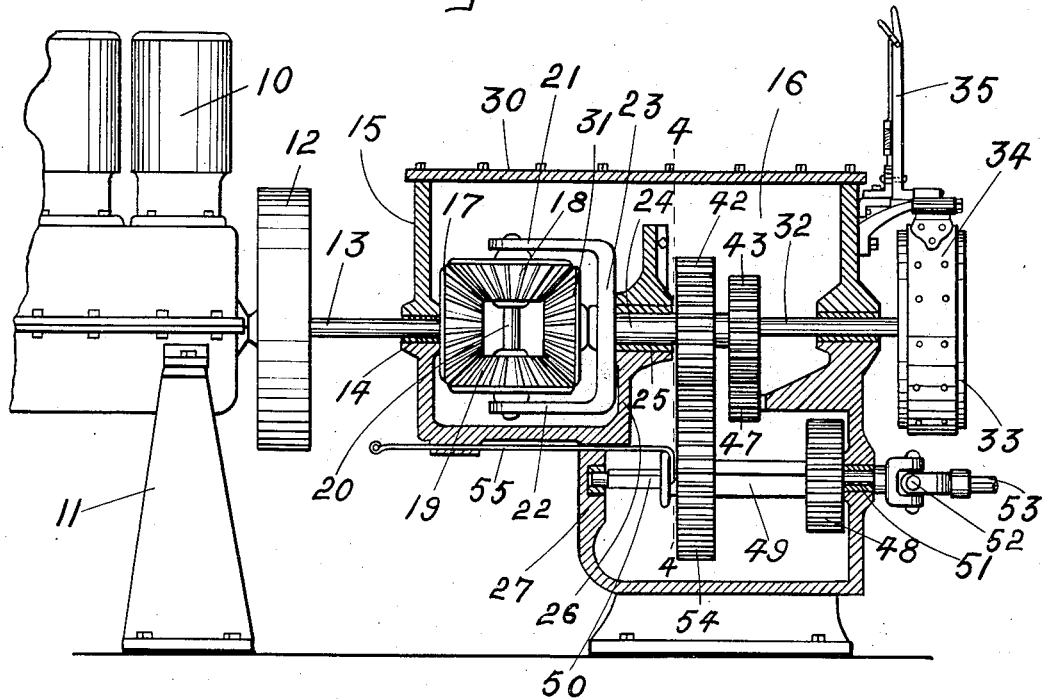
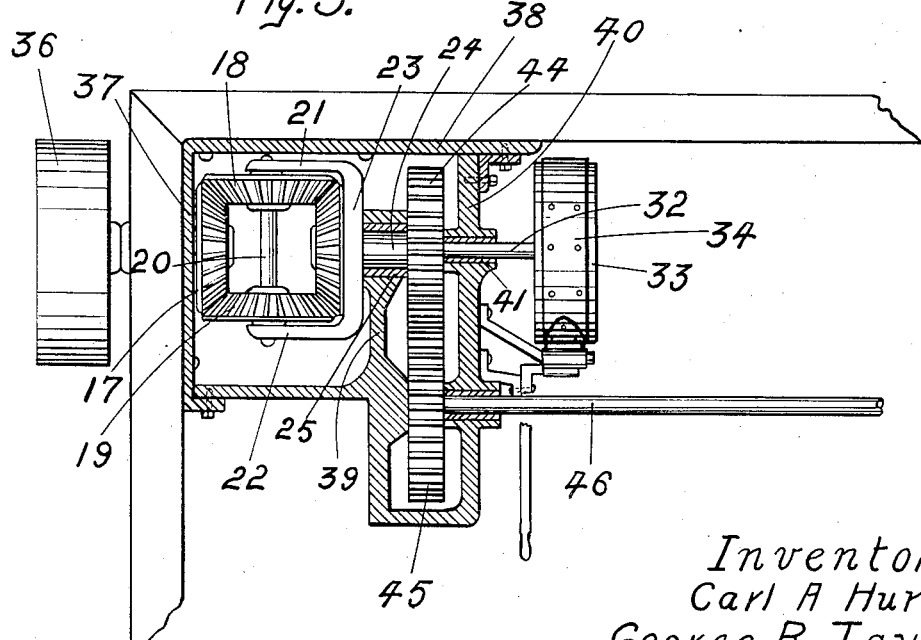
Inventors
Carl A Hurtig
George R Taylor
by
his Attorney

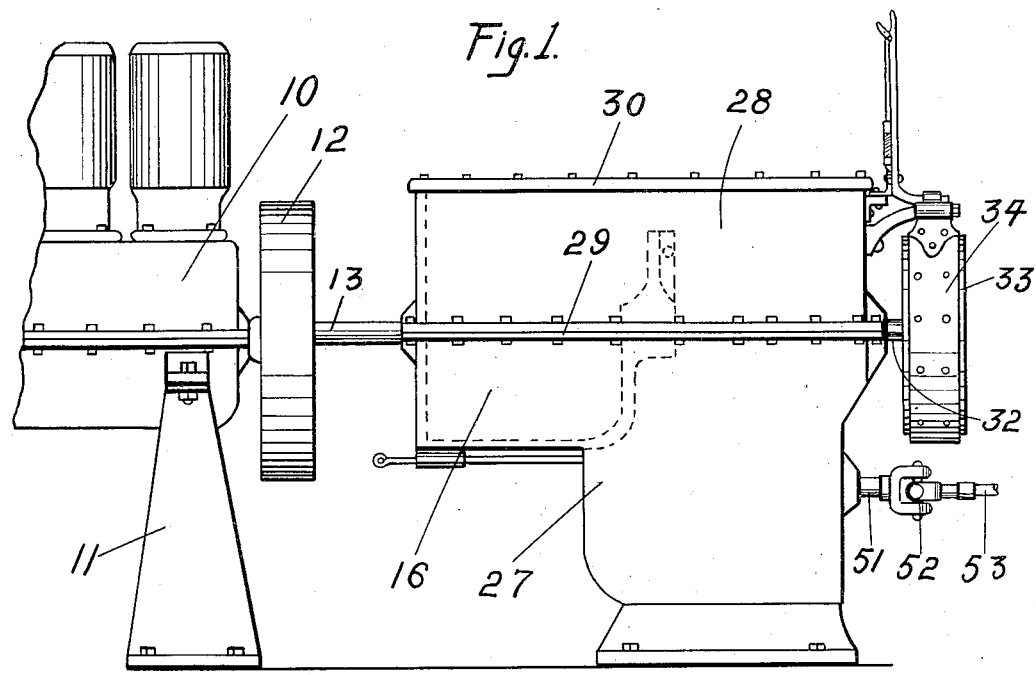
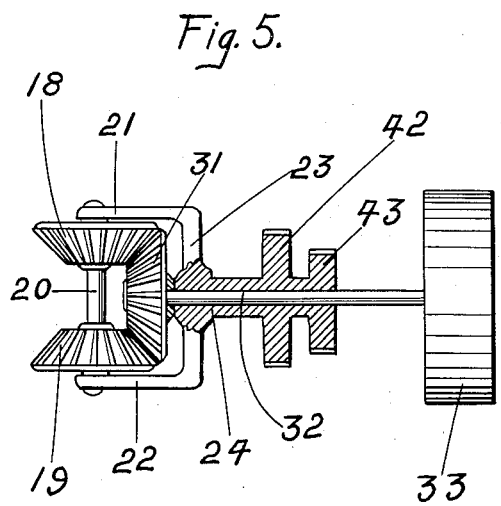
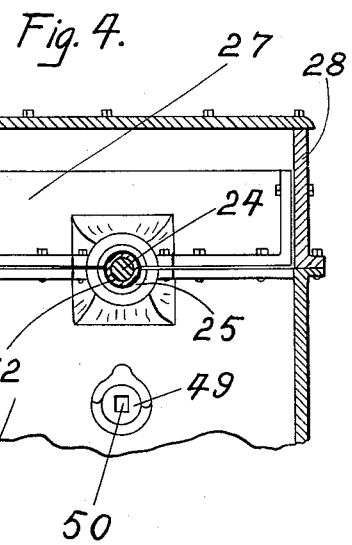

UNITED STATES PATENT OFFICE.

CARL A. HURTIG AND GEORGE R. TAYLOR, OF ST. PAUL, MINNESOTA.

CHANGE-SPEED DEVICE.

1,304,052.     Specification of Letters Patent.     Patented May 20, 1919.

Application filed May 2, 1917. Serial No. 166,025.

*To all whom it may concern:*

Be it known that we, CARL A. HURTIG and GEORGE R. TAYLOR, citizens of the United States, residing at St. Paul, in the county of Ramsey and State of Minnesota, have invented certain new and useful Improvements in Change-Speed Devices, of which the following is a specification.

Our invention relates to change-speed devices and has for its object to provide a mechanism for changing the speed of a driven member such as an automobile or a drive shaft in a shop or factory through any number of degrees of variation, either directly or in reverse direction, without the use of any change-speed gearing excepting only reversing gearing, and without using any clutch.

In carrying out our invention we provide a peculiar type of differential gear mechanism in association with a brake whereby the speed of the drive may be accurately varied and modified in proportion to the force applied to the braking device.

The full objects and advantages of our invention will appear in connection with the detailed description thereof and are particularly pointed out in the claims.

In the drawings, illustrating the application of our invention in one form,—

Figure 1 is a side elevation view of part of an explosive engine and our change-speed mechanism applied thereto. Fig. 2 is a similar view partly in section. Fig. 3 is a view of driving mechanism applicable for machine or factory use. Fig. 4 is a section on line 4—4 of Fig. 2. Fig. 5 is a section along the shaft mechanism.

As illustrated, an explosive engine 10 of usual type supported by any desirable base member, as 11, has a fly wheel 12 on the crankshaft 13 thereof, which crankshaft is journaled in a bearing 14 in the front wall 15 of a casing 16. Upon the crankshaft 13 is a bevel gear 17 which meshes with a pair of bevel gears 18 and 19 journaled upon a cross shaft 20 which is supported by arms 21 and 22 of a yoke piece 23 which has a sleeve hub 24 journaled in a bearing 25 formed conjointly in a partition wall 26 and a separable piece 27 bolted to casing 16, as shown in Fig. 4, the casing 16 being preferably formed of a lower section 27 and an upper section 28 bolted together at 29 and closed by a cover member 30, as clearly shown.

Meshing with bevel gears 18 and 19 is a bevel gear 31 fast on a shaft 32 which has a bearing in the sleeve hub 24 and which is provided at the end thereof with a brake drum 33 coöperating with a brake 34 controlled by a hand lever 35 in any well-known way.

As shown in Fig. 3, a pulley or electric motor 36 is the source of power by which bevel gear 17 is driven, which is journaled in a bearing formed on a wall 37 of a hanger bracket 38, secondary hanger members 39, 40 providing the bearing 25 for the sleeve hub 24 and a bearing 41 for shaft 32. As shown in Figs. 2 and 5, the sleeve hub 24 has integrally connected therewith a pair of spur gears 42 and 43, while in the form shown in Fig. 3 a single spur gear 44 is integrally connected with sleeve hub 24. The gear 44 meshes with a spur gear 45 on a shaft 46 journaled in hanger frames 39, 40, which shaft 46 transmits power to any machine or device which may need to be operated. Spur gear 43 meshes with an idler pinion 47 which is adapted to mesh with a spur gear 48 on a sleeve 49 which slides upon the square portion 50 of a countershaft 51 connected by universal joint 52 with a propeller shaft 53. Spur gear 42 is adapted to mesh with a spur gear 54 fast on sleeve 49, sleeve 49 being operated through a link 55 in a well-known way to shift the gears for imparting reverse motion to propeller shaft 53.

In either form of construction the change of speed is effected by the application of braking force upon brake band 34. When the brake band is loose the yoke member 23, sleeve hub 24 and connected parts will be stationary, and shaft 32 and brake drum 33 will be driven by the compound action of bevel gear 17 meshing with bevel gears 18 and 19, and bevel gear 31 meshing with the same bevel gears. The engine or prime mover may, therefore, be running at full speed without having any effect upon propeller shaft 53 or drive shaft 36. When, however, a braking action is applied to brake drum 33, thus tending to hold shaft 32 stationary, the yoke 23 and the hub sleeve 24 will be rotated through the coöperative action of bevel gear 17 meshing with bevel gears 18 and 19 and relatively stationary bevel gear 31 meshing with bevel gears 18 and 19. The speed of revolution of yoke member 23 will be varied in proportion to the braking action upon brake drum 33 from the smallest action that will cause yoke member 23 to turn at all up to the maximum action when shaft 32 is held absolutely stationary In this manner, by very simple construction a driving device such as the propeller of an automobile or a line shaft or drive shaft for a machine may be started from an engine running at full speed and may be gradually accelerated up to the speed of the engine. Such an operation is especially desirable in starting automobiles or machines in factories, where it is essential to obtain the best results, that the speed of the elements started shall be gradually accelerated, and where it is desirable that the prime mover shall be at all times running at maximum or full speed.

We claim:

1. A change speed gearing comprising a driving shaft, a beveled gear secured to said driving shaft, an idler shaft, a beveled gear secured to said idler shaft, a brake for said idler shaft, a yoke member, beveled gears mounted on said yoke member and meshing with both of the first mentioned beveled gears, a sleeve secured to said yoke and rotatably positioned around said idler shaft, a gear secured to said sleeve, and means for actuating said brake to effect different degrees of retardation of the idler shaft whereby corresponding degrees of acceleration of the yoke member and the last mentioned gear are effected.

2. A change speed gearing comprising a driving shaft, a beveled gear secured to said driving shaft, an idler shaft, a beveled gear secured to said idler shaft, a brake for said idler shaft, a yoke member, beveled gears mounted on said yoke member and meshing with both of the first mentioned gears, a sleeve secured to said yoke and rotatably positioned around said idler shaft, a counter-shaft, driving connections between said sleeve and said counter-shaft, means for actuating said brake to effect different degrees of retardation of the idler shaft whereby corresponding degrees of acceleration of the yoke member and the counter-shaft are effected, and means for adjusting said driving connections to reverse the direction of rotation of said counter-shaft.

In testimony whereof we affix our signatures.

CARL A. HURTIG.
GEORGE R. TAYLOR.